(12) United States Patent
Cantillo et al.

(10) Patent No.: US 8,479,074 B2
(45) Date of Patent: Jul. 2, 2013

(54) METHOD AND MODULE FOR CORRECTING TRANSMISSION ERRORS IN A DATASTREAM, COMMUNICATION SYSTEM COMPRISING SAID MODULE

(75) Inventors: Juan Cantillo, Toulouse (FR); Jérôme Lacan, Toulouse (FR); Isabelle Buret, Plaisance du Touch (FR); Fabrice Arnal, Toulouse (FR)

(73) Assignee: Thales, Neuilly Sur Seine (FR)

( * ) Notice: Subject to any disclaimer, the term of this patent is extended or adjusted under 35 U.S.C. 154(b) by 377 days.

(21) Appl. No.: 12/747,517

(22) PCT Filed: Dec. 2, 2008

(86) PCT No.: PCT/EP2008/066618
§ 371 (c)(1),
(2), (4) Date: Jul. 30, 2010

(87) PCT Pub. No.: WO2009/074489
PCT Pub. Date: Jun. 18, 2009

(65) Prior Publication Data
US 2010/0318882 A1 Dec. 16, 2010

(30) Foreign Application Priority Data
Dec. 11, 2007 (FR) ...................................... 07 08623

(51) Int. Cl.
*G08C 25/02* (2006.01)
(52) U.S. Cl.
USPC .......................................... 714/748; 714/776
(58) Field of Classification Search
USPC .......................................... 714/748, 749, 776
See application file for complete search history.

(56) References Cited

U.S. PATENT DOCUMENTS

| | | | |
|---|---|---|---|
| 6,879,628 B1 * | 4/2005 | Choi | 375/224 |
| 7,930,617 B1 * | 4/2011 | Gass et al. | 714/784 |
| 2002/0089967 A1 | 7/2002 | Brajal et al. | |
| 2005/0185743 A1 * | 8/2005 | Li | 375/350 |
| 2006/0242547 A1 * | 10/2006 | Maiuzzo | 714/795 |
| 2006/0279656 A1 * | 12/2006 | Tsuchie | 348/446 |

FOREIGN PATENT DOCUMENTS

GB 2 371 952 A 8/2002

OTHER PUBLICATIONS

Shark et al., "New High-Speed Adaptive Frame Synchronisers Incorporating Postdetection Processing Techniques", IEE Proceedings I. Solid-State & Electron Devices, Institution of Electrical Engineers, Aug. 1, 1991, pp. 269-279, vol. 138, No. 4, Stevenage, Herts, GB.

Schulze et al., "Time Synchronization", Theory and Applications of OFDM and CDMA, Wideband Wireless Communications, Jan. 1, 2005, pp. 176-177, John Wiley & Sons, Ltd., Chichester, England.

\* cited by examiner

*Primary Examiner* — Yolanda L Wilson
(74) *Attorney, Agent, or Firm* — Baker Hostetler LLP

(57) ABSTRACT

The subject of the present invention is a method for correcting transmission errors in a data stream transmitted by a communications system using a protocol stack. According to the invention, the method consists in utilizing the redundancy of sequences whose content is fixed across several layers in a stack of protocols so as to correct transmission errors; the method consisting to this end in searching at the level of the receiver for sequences corresponding to a known sequence present in the stream received and doing so by detecting sequences similar to this known sequence, non-similar sequences not being retained; the method consisting furthermore, when similar sequences are present, in detecting transmission errors in the known sequence and in modifying the similar sequences (erroneous sequences) with the aid of the known sequence.

16 Claims, 9 Drawing Sheets

Figure 14

METHOD AND MODULE FOR CORRECTING TRANSMISSION ERRORS IN A DATASTREAM, COMMUNICATION SYSTEM COMPRISING SAID MODULE

CROSS-REFERENCE TO RELATED APPLICATIONS

This application is a National Stage of International Patent Application No. PCT/EP2008/066618, filed on Dec. 2, 2008, which claims priority to foreign Patent Application No. FR 07 08623, filed on Dec. 11, 2007, the disclosures of which are incorporated herein by reference in their entirety.

FIELD OF THE INVENTION

The invention relates to a method and a module for correcting transmission errors in a data stream transmitted through a communication channel. The invention applies to any digital communications system. The invention applies to satellite communications and to ATM over ADSL links.

BACKGROUND OF THE INVENTION

The techniques most widely employed today for detecting and/or correcting transmission errors in digital communications systems are error correcting codes, rerunning of errors on retransmission and cyclic redundancy checks, known respectively by the acronyms FEC (for Forward Error Correction), ARQ (for Automatic Repeat Request) and CRC (for Cyclic Redundancy Check).

The FEC technique entails the sender adding redundancy to the useful data so as to allow the destination receiver to detect and to correct some of the inevitable transmission errors. This technique constitutes the only means for correcting errors in systems with no return pathway. In systems with a return pathway, this technique furthermore decreases the number of retransmissions required to ensure a given quality of service.

Represented in FIG. 1 is the diagram of a communication system implementing a method for correcting transmission errors according to the prior art. The communication system includes a transmission chain comprising a sending source S, a communication channel C and a receiver R. The sending source S is furnished with an FEC coder 10 for coding the incoming data stream FD followed by a modulator 20. The output stream from the modulator 20 is transmitted by the communication channel C. The receiver R receives the incoming stream FE transmitted by the communication channel C. This receiver R comprises a demodulator 40 followed by an FEC decoder 60. The labels 50 and 70 correspond to points where the bit error rate BER could be measured.

The CRC technique makes it possible to detect certain errors by adding redundancy, but does not make it possible to correct them. The redundancy is obtained by calculating a hash function on a logical subset of the data to be sent, for example a packet, and dispatched with the latter. On reception this value is compared with the calculation of the same hash function on the data received, so as to verify the integrity of the message. The CRCs most widely used are constructed so as to detect the vast majority of the errors that are not corrected by the FEC, or are due to defective re-assembling of data fragmented when sending.

The FEC schemes of the prior art such as LDPC (Low Density Parity Check) codes, Reed-Solomon codes and Turbo codes are used in the most recent European satellite standards (for example DVB-S2 and DVB-SH) with the aim of detecting and correcting errors on the transmission channel.

CRC codes are conventionally used for data integrity verification in the intermediate layers of the protocol stacks, making it possible to detect errors and then, optionally, to discard defective re-assembled packets.

The techniques which have just been described are based on the addition of control or redundancy data to the useful stream. Despite the gain in terms of error control represented by these techniques, the addition of control or redundancy data penalizes transmission performance in terms of quantity of useful information actually transmitted, and consequently in terms of transmission cost.

SUMMARY OF THE INVENTION

The aim of the present invention is to remedy this drawback by proposing a solution which improves the reliability of the transmission of a data stream without adding any data (i.e. neither redundancy data, nor control information) to the useful stream transmitted.

The method for correcting errors according to the invention makes it possible to decrease the bit error rate (BER) and the packet error rate (PER) of a digital communications system without reducing the resources of this system (bandwidth, throughput). The method can be put in place whatever the communication system, alone or in combination with known error correcting methods.

The subject of the present invention is a method for correcting transmission errors in a data stream belonging to a given protocol stack by implementing multilayer techniques.

In the stacks of protocols, a great deal of control information is replicated in all the packets belonging to the same logical streams.

According to the invention, the method consists in utilizing the natural redundancy of these streams, the main manifestation of which is the predictable and recurrent repetition of sequences whose content is fixed, these known sequences termed SP being constructed on the basis of control information characteristic of the various layers of the protocol stack, this redundancy being used with the aim of correcting transmission errors; the method consisting to this end in searching, on a data stream received, for the original positions of the known sequences SP by detecting sequences similar to this known sequence SP, non-similar sequences, that is to say different sequences, not being retained; the method consisting, when similar sequences are present, in detecting one or more transmission errors produced on a known sequence SP, and in modifying the similar sequences detected with the aid of the known sequence SP.

According to another feature of the invention, it is possible to use this mechanism for correcting errors at any level of the reception chain.

Thus hereinafter, the term sequence must be understood to mean either a discrete sequence (that is to say a series of binary symbols or of symbols resulting from quantized information), or else a portion of signal corresponding to a discrete sequence, depending on whether the incoming stream is processed after demodulation or before.

Furthermore, the expression binary symbols is understood to mean one or more bits.

The subject of the present invention is more particularly a method for correcting transmission errors on reception in a data stream by a communications system using any stack of protocols, said method being mainly characterized in that it comprises the following steps:

for an incoming data stream comprising a known sequence SP, the search for sequences similar to the known sequence SP, non-similar sequences not being retained, the detection of erroneous known sequences in a case where similar sequences are present, and the modification of the erroneous sequences detected.

According to the method of the invention, the data of the stream can be in the form of binary symbols or in the form of real or quantized data.

In the case where the data are in the form of binary symbols, the modification of the erroneous sequences consists in replacing the erroneous binary sequence with the known binary sequence SP.

In the case where the data are in the form of real or quantized data, the modification of the erroneous sequences consists in replacing the sequence of real or quantized signals with a sequence of signals that is representative of the known sequence SP.

The known sequence SP is not necessarily composed of symbols that are contiguous in the incoming stream.

The known sequence SP is a sequence constructed on the basis of static information fields, that is to say protocol fields whose content is constant for all the data packets of the incoming stream.

One of the fields that can form part of the known sequence SP is for example a destination address or a source address, placed in the headers of the packets of the data stream.

One of the fields that can form part of the known sequence SP is for example an item of information regarding coding of the type of following headers.

The search for a known sequence SP is carried out continuously on the incoming data stream.

The search for a known sequence SP in the incoming stream comprises the opening of an analysis window W of length equal to the length of the known sequence SP, the calculation of a detection threshold 11, the calculation of a measure of similitude between an analyzed sequence and the known sequence SP, detection of a similar sequence taking place when the measured similitude is greater than or equal to the threshold $\eta$.

In the case of binary signals, this similitude measure corresponds for example to a calculation of distance of Hamming distance type. In the case of the real or quantized signals, this measure corresponds for example to a correlation type calculation.

The threshold $\eta$ is chosen so as to obtain a maximum probability of recovery of the known sequences PSR, this threshold $\eta$ then corresponding to an estimation of the optimum threshold $\eta_{opt}$.

The search for a known sequence is carried out continuously by sliding the analysis window by one position at each displacement.

The displacement by one position corresponds for example to a byte by byte or bit by bit displacement in the incoming stream.

The invention also relates to a module for correcting transmission errors in a data stream transmitted by a communications system using a stack of protocols, mainly characterized in that it comprises:

an input for receiving a data stream comprising a known sequence SP, means for searching for sequences similar to the known sequence SP, non-similar sequences not being retained, means for detecting erroneous known sequences in a case where similar sequences are present and for modifying the erroneous sequences detected.

The means for searching for sequences corresponding to the known sequence and for detecting similar sequences comprise:

a window W of length equal to the length of the known sequence SP, for the analysis in the stream of sequences traveling through the window, means for calculating a detection threshold $\eta$, means for calculating a measure of similitude between an analyzed sequence and the known sequence SP and means for detecting a similar sequence, detection taking place when the measured similitude is greater than or equal to the threshold $\eta$.

The means for detecting erroneous known sequences comprise means for modifying the detected similar sequence when the measured similitude is greater than or equal to the detection threshold.

In the case where the data are in the form of binary symbols, the modification of the erroneous sequences consists in replacing the erroneous binary sequence with the known binary sequence SP.

In the case where the data are in the form of real or quantized data, the modification of the erroneous sequences consists in replacing the sequence of real or quantized signals with a sequence of signals that is representative of the known sequence SP.

The analysis window is a sliding window displacing from a position i to a position i+1 after each analysis of a sequence of predetermined length F, formed of the symbols received indexed from i to i+F−1.

The invention also relates to a data stream communication system comprising a reception chain mainly characterized in that said reception chain comprises an error correction module as previously described.

In such communications systems, the reception chain comprises a demodulator and an FEC decoder. The error correction module can equally well be placed before, inside or after the demodulator.

The invention applies for example to satellite communication systems.

The invention applies for example to links using ATM over ADSL.

BRIEF DESCRIPTION OF THE DRAWINGS

Other features and advantages of the invention will be clearly apparent on reading the description given hereinafter by way of illustrative and nonlimiting example and with reference to the figures, in which:

FIG. 14 is a hexadecimal representation of a series of incoming packets in the case of an FTP/TCP/IP/Ethernet protocol stack, captured at the Ethernet level, highlighting the existence of repeated sequences in the control information of each packet which can constitute the known sequence SP.

DETAILED DESCRIPTION

Figure 1:
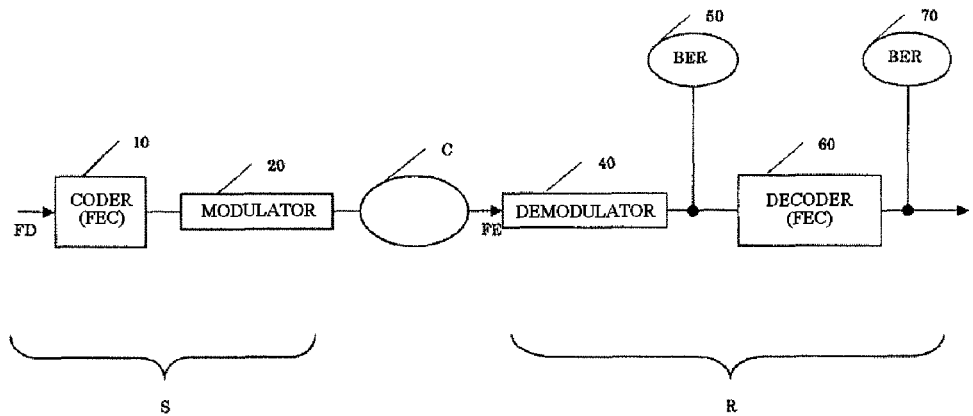
FIG. 1 represents the diagram of a communication system for communicating a data stream with a transmission chain according to the prior art.

The method for correcting transmission errors according to the invention applies to communication systems using stacks of protocols. Non-exhaustive examples of protocol stacks to which this method applies are TCP/IP or UDP/IP. It applies to any digital communications system and in particular to satellite communication systems and to ATM over ADSL links.

In a data stream transmitted by a protocol stack, one or more known sequences SP are transmitted.

The known sequences SP are sequences containing "static" information fields, that is to say fields whose content is constant and possibly known to the receiver for all the packets of the stream. They may be subsets of bits belonging to various header fields such as for example the addresses of the MAC or IP levels of the sending source or of the receiver, TCP or UDP ports, the type of protocol or its version. The bits of the subset are not necessarily contiguous but their relative position in the header is known.

According to the error correction method, the stream FE transmitted by the communication channel C of the transmission chain and incoming at the receiver end R is analyzed so as to search for the known sequences SP of the stream.

The data of the stream that are processed according to the method can be in the form of binary symbols or in the form of real or quantized data.

The method comprises the determination of a detection threshold $\eta$ for known sequences SP. The detection threshold $\eta$ is chosen so as to have a maximum probability of recovery of the known sequences PSR. The threshold chosen is preferably an optimum threshold $\eta_{opt}$, that can be estimated by analysis of the stream received. This optimum threshold $\eta_{opt}$ takes account of the mean number L of symbols between two occurrences of the known sequence SP in the stream (the mean length of the packets) and of the state of the communication channel C. The state of the communication channel is represented by an estimated variable $\epsilon$ corresponding to the noise conditions. The value of L and the state of the channel are estimated values obtained for example by a conventional estimator or by other procedures.

In the case of errors introduced by transmission, the method makes it possible to detect in the stream sequences similar to the expected known sequences SP, that is to say sequences that are identical or very close, this proximity being established on the basis of a predetermined similarity criterion; non-similar sequences, that is to say different sequences, not being retained.

When an analyzed sequence meets the similarity criterion a so-called "similar" sequence is detected. This similarity criterion is fulfilled when the analyzed sequence exhibits a degree of similitude with the known sequence SP that is greater than or equal to the limit defined by the estimation of the optimum detection threshold $\eta_{opt}$.

The method comprises the detection of erroneous known sequences, this corresponding to the detection of similar sequences.

The method comprises the modification of the erroneous sequences detected.

In the case where the data are in the form of binary symbols, the modification of the erroneous sequences consists in replacing the erroneous binary sequence with the known binary sequence.

In the case where the data are in the form of real or quantized data, the modification of the erroneous sequences consists in replacing the sequence of real or quantized signals with a sequence of real signals that is representative of the known sequence.

The analysis of the incoming stream FE is carried out by means of a sliding window W. The window W is a sliding window displacing from a position i to a position i+1 after each analysis of a sequence of predetermined length F formed of the symbols received indexed from i to i+F−1.

Figure 2:
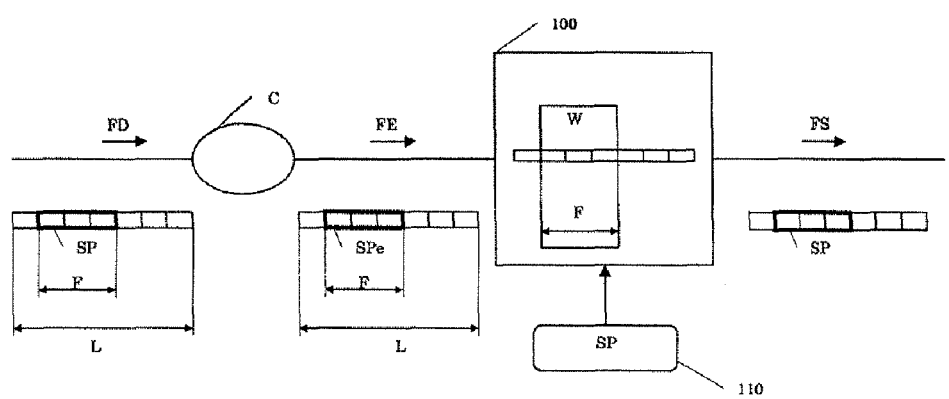
FIG. 2 represents the diagram of an error correction module placed on a transmission chain according to the invention.

FIG. 2 represents the diagram of an error correction module 100 placed on a transmission chain containing a protocol stack communication channel C. The module 100 receives a stream FE of data packets transmitted by the channel C.

The mean length of the packets is L,

The length of the known sequences SP is F,

On output from the channel the known sequences SP may have been transmitted with errors, as illustrated by the sequence SPe.

The module 100 receives higher layers 110 of the information relating to the constituent fields of the known sequence SP for all the packets of the stream. These data serve to determine the known sequence SP to be searched for in the stream by the module 100.

The module 100 comprises an analysis window W for analyzing the data received. The sliding window W is a window displacing from a position i to a position i+1 after each analysis of a sequence of predetermined length F formed of the symbols received indexed from i to i+F−1.

Figure 3:
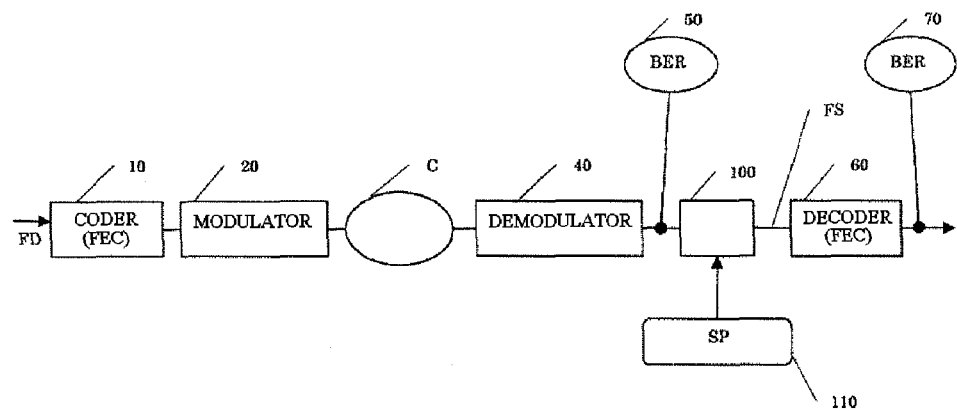
FIG. 3A represents the diagram of a communication system for communicating a data stream between a sending source S and a reception chain R comprising an error correction module placed between the demodulator and the decoder.
FIG. 3B represents the diagram of a communication system for communicating a data stream between a sending source S and a reception chain R comprising an error correction module placed before the demodulator.
Figure 3:
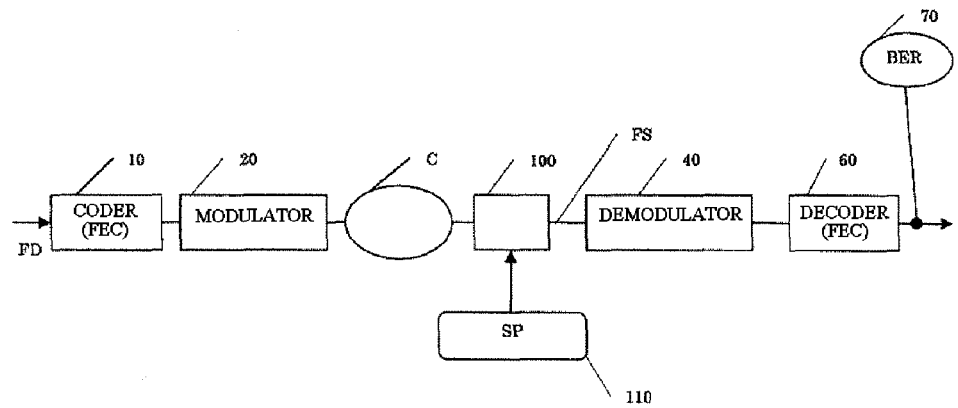

FIG. 3A represents a communication system as represented in FIG. 1 but in which an error correction module 100 according to the invention has been embedded. In this exemplary embodiment, the module 100 is embedded between the demodulator 40 of the receiver R and the decoder 60. The detection of errors is carried out after demodulation of the signal. The known sequences SP searched for are discrete sequences (series of binary symbols or results of quantized information).

FIG. 3B represents a second embodiment of a communication system according to the invention. In this embodiment, the correction of transmission errors is carried out before demodulation. The known sequences SP searched for are a signal portion corresponding to a discrete sequence.

Figure 4:
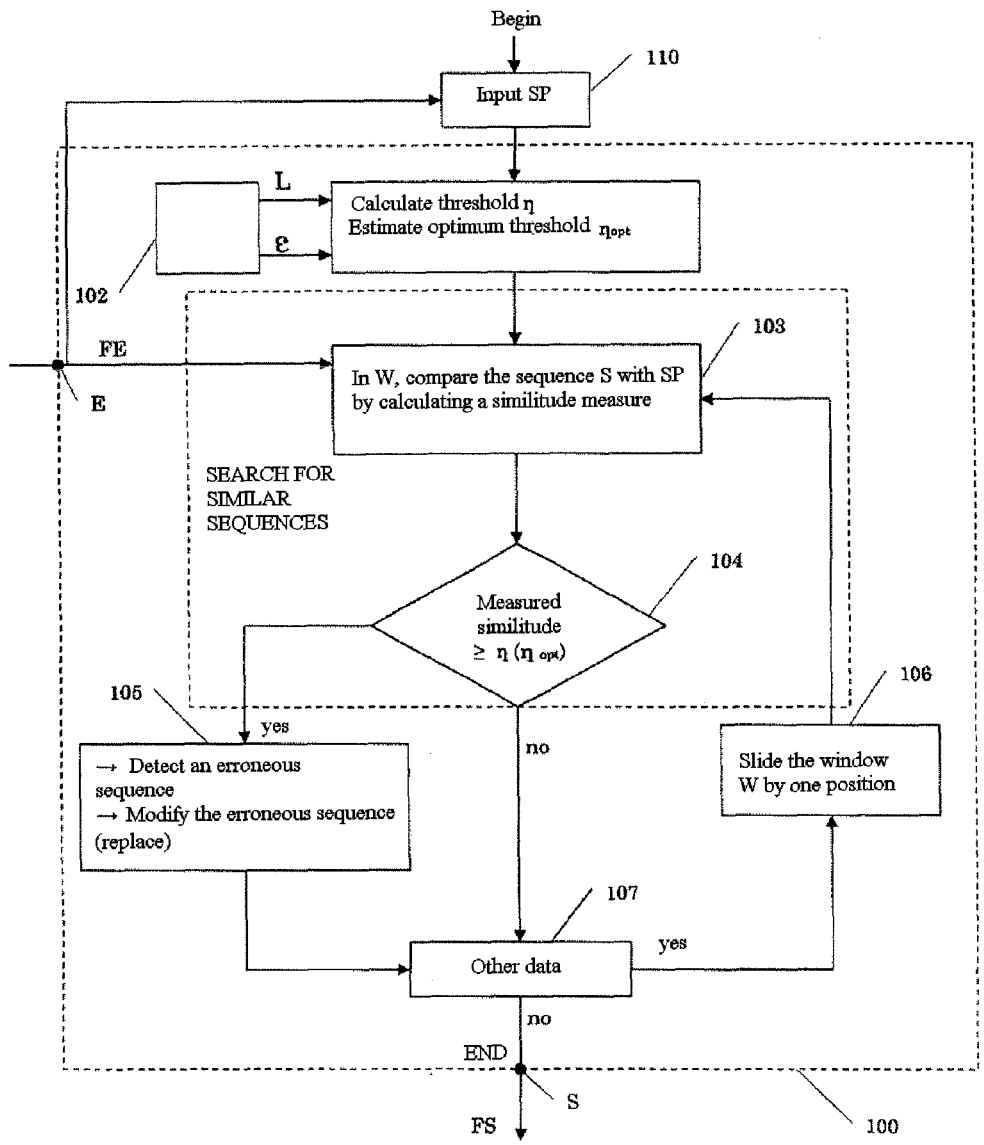
FIG. 4 represents the detailed diagram of the steps implemented by the module for correcting errors according to the invention.

FIG. 4 illustrates the steps implemented by the error correction module 100.

110—The higher layers at the level of the receiver R provide the module 100 with information relating to the known sequence SP of the incoming stream FE so that the module 100 undertakes the search for these sequences in the stream FE.

101, 102, 103, 104—The module 100 searches through the stream FE for the probable positions of the known sequences by successive comparison of sequences of symbols with the known sequence SP in accordance with a predetermined criterion. The steps implemented are as follows:

101, 102—the module determines the detection threshold for a known sequence, this threshold corresponding to a satisfactory similitude making it possible to reject very different sequences, that is to say sequences whose similitude is below the threshold. In practice, the detection threshold $\eta$ for known sequences SP is chosen so as to maximize the probability of recovery of the known sequences PSR. The threshold chosen is an estimation of an optimum threshold $\eta_{opt}$. This optimum threshold $\eta_{opt}$ takes account of the mean number of symbols L between two occurrences of the known sequence (the mean length of the packets) and of the state of the communication channel C, represented by the variable $\epsilon$. The value of L and the state of the channel are estimated values obtained by the estimator 102.

103—the module analyses the sequence present in the window W, by measuring its similitude to the known sequence SP.

104—the module compares the detection threshold $\eta$ with the measured similitude.

The module 100 performs a detection 105 of erroneous known sequences in a case where similar sequences are present, that is to say the sequences whose measured similitude with the known sequence SP is above the threshold $\eta$, and modifies the similar sequences with the aid of the known sequence.

In the case where the data are in the form of binary symbols, the modification of the erroneous sequences consists in replacing the erroneous binary sequence with the known binary sequence.

In the case where the data are in the form of real or quantized data, the modification of the erroneous sequences consists in replacing the sequence of real or quantized signals with a sequence of real signals that is representative of the known sequence.

107—The module checks the end of the stream and slides 106 the analysis window W by one position.

Figure 5:
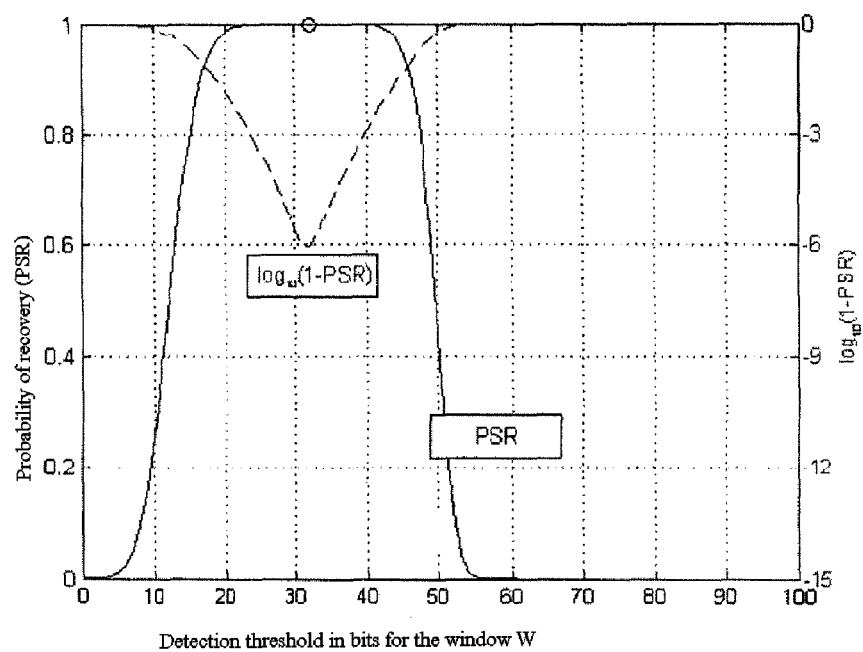
FIG. 5 represents the curve of variation of the probability of recovery of the known sequences of a known sequence in the analysis window as a function of the detection threshold $\eta$, according to chosen transmission channel noise conditions represented by a variable $\epsilon$ and for a chosen length F of known sequence.

Represented in FIG. 5 is the curve of variation of the probability of recovery of the known sequences as a function of the detection threshold $\eta$ for a length F of known sequence SP equal to 16 bytes, and significant noise conditions represented by the variable $\epsilon$, $\epsilon=10^{-1}$ (1 bit out of 10 erroneous). The dashed line represents the logarithmic distance between the probability of recovery of the known sequences and 1.

Figure 6:
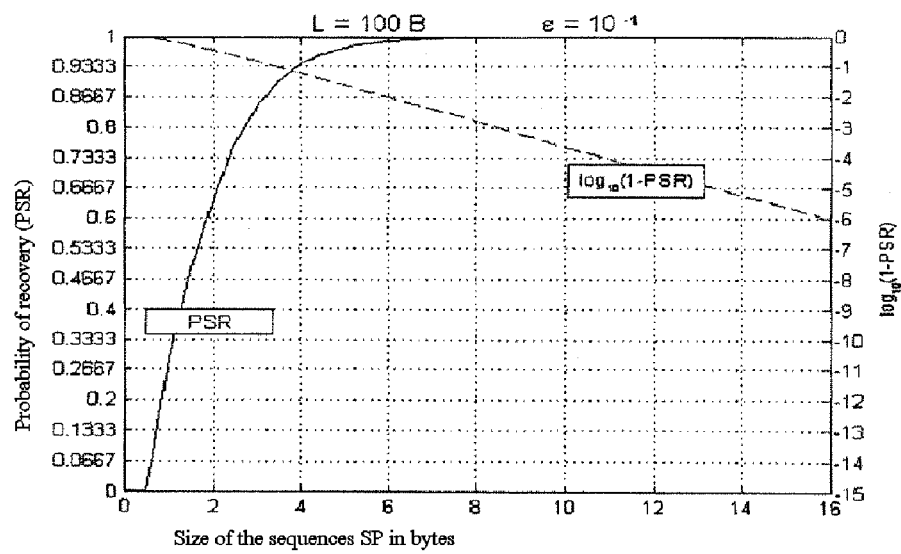
FIG. 6 represents the curve of variation of the probability of recovery of the known sequences of a known sequence in the analysis window as a function of the size F of the known sequence, according to chosen channel noise conditions represented by a variable $\epsilon$ and a number of symbols L between two successive occurrences in the original stream of the known sequence.
Figure 7:
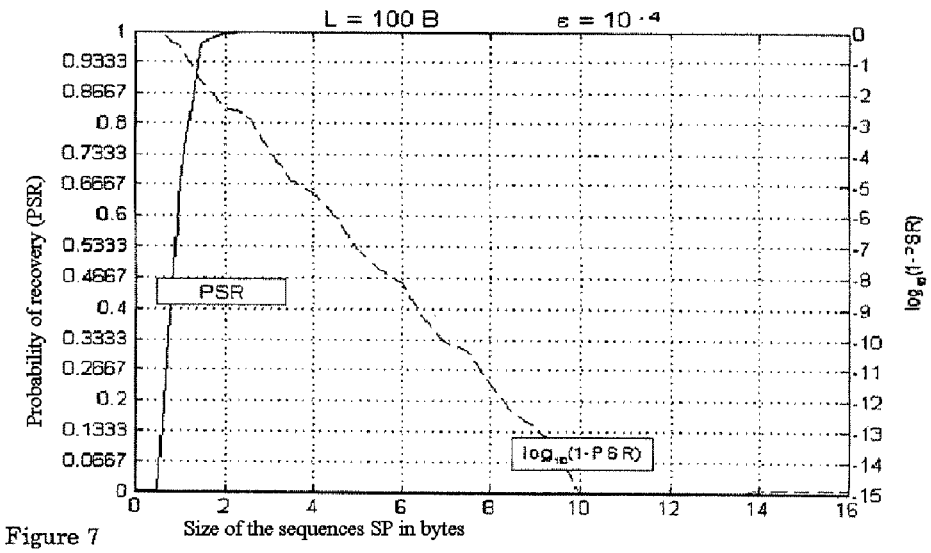
FIG. 7 represents the curve of variation of the probability of recovery of the known sequences of a known sequence in the analysis window as a function of the size F of the known sequence according to channel noise conditions represented by a variable $\epsilon$ which differs from that of FIG. 6 and the same number L of symbols between two successive occurrences in the original stream of the known sequence.

Represented in FIGS. 6 and 7 are the curves of variation of the probability of recovery of the known sequences of a known sequence SP in the analysis window for noise conditions $\epsilon=10^{-1}$ and $\epsilon=10^{-4}$ respectively and a number of symbols L between two successive occurrences of the known sequence SP (mean size of the packets) of 100 bytes.

Figure 8:
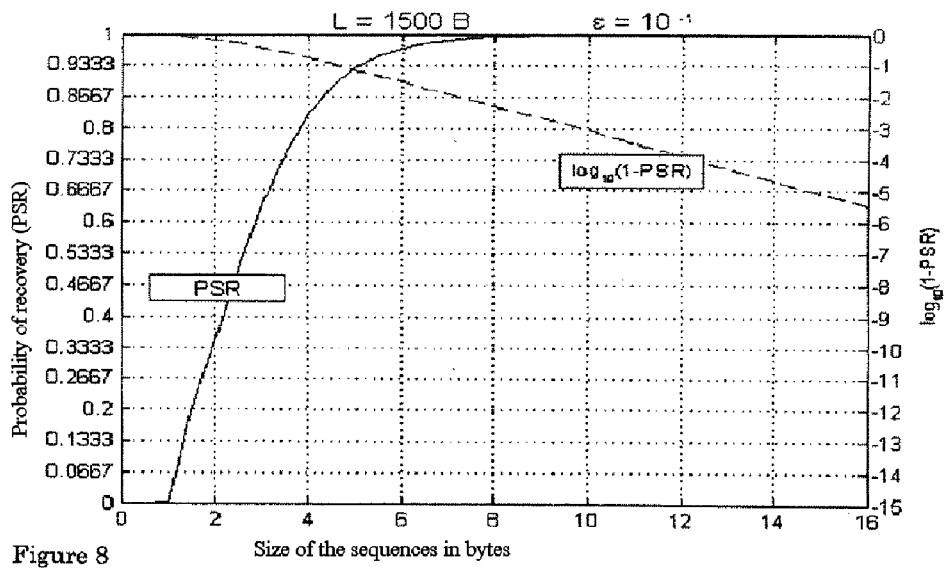
FIG. 8 represents the curve of variation of the probability of recovery of the known sequences of a known sequence in the analysis window as a function of the size F of the known sequence according to a second number L of symbols between two successive occurrences of the known sequence and chosen channel noise conditions represented by a variable $\epsilon$.
Figure 9:
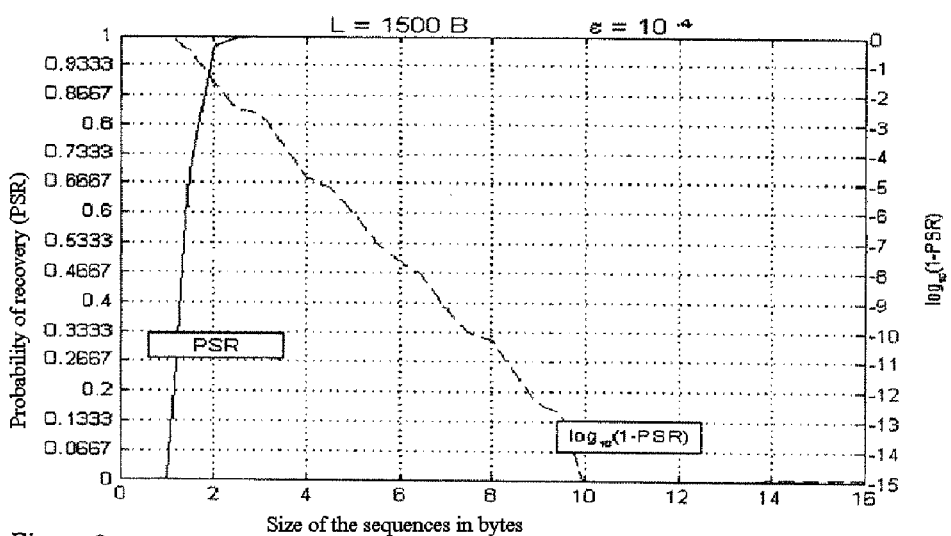
FIG. 9 represents the curve of variation of the probability of recovery of the known sequences of a known sequence in the analysis window as a function of the size F of the known sequence, according to channel noise conditions represented by a variable $\epsilon$ which differs from that of FIG. 8 and the same number L of symbols between two occurrences of the known sequence.

Represented in FIGS. 8 and 9 are the curves of variation of the probability of recovery of the known sequences of a known sequence in the analysis window, for noise conditions $\epsilon=10^{-1}$ and $\epsilon=10^{-4}$ respectively and a number of symbols L between two successive occurrences of the known sequence SP (mean size of the packets) of 1500 bytes.

FIGS. 10 to 13 illustrate curves for estimating the performance obtained by simulating a communication system implementing the method.

Figure 10:
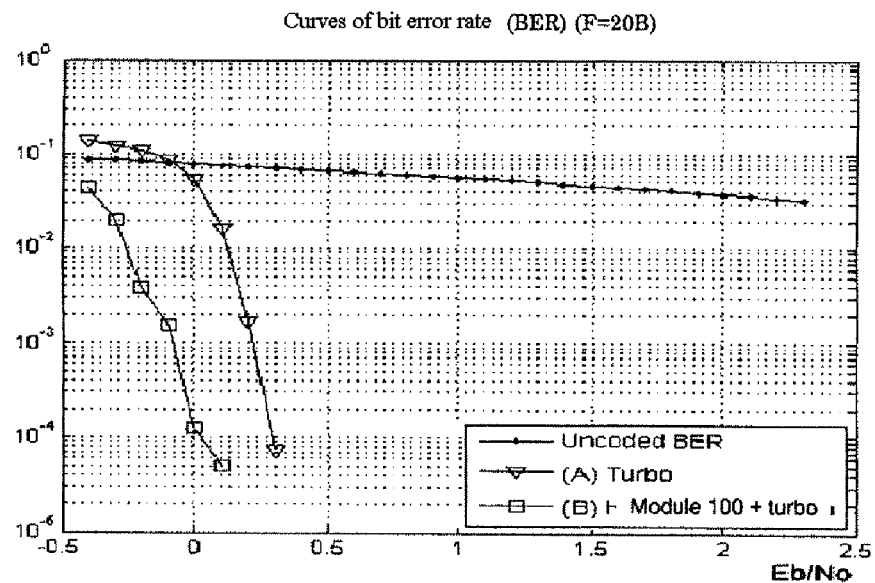
FIG. 10 illustrates curves of variation of the bit error rate BER with the installing of a corrector module according to the present invention and the methods according to the prior art for a given known sequence length F (F=20 bytes).

Represented in FIG. 10 are curves of variation of the bit error rate BER in the case of correction performed by the module 100 and Turbo coding (curve with square symbols); in the case of the Turbo coding prior art (curve with triangle); and without correction (curve with dots). These curves have been obtained for a length F of known sequence SP equal to 20 bytes.

Figure 11:
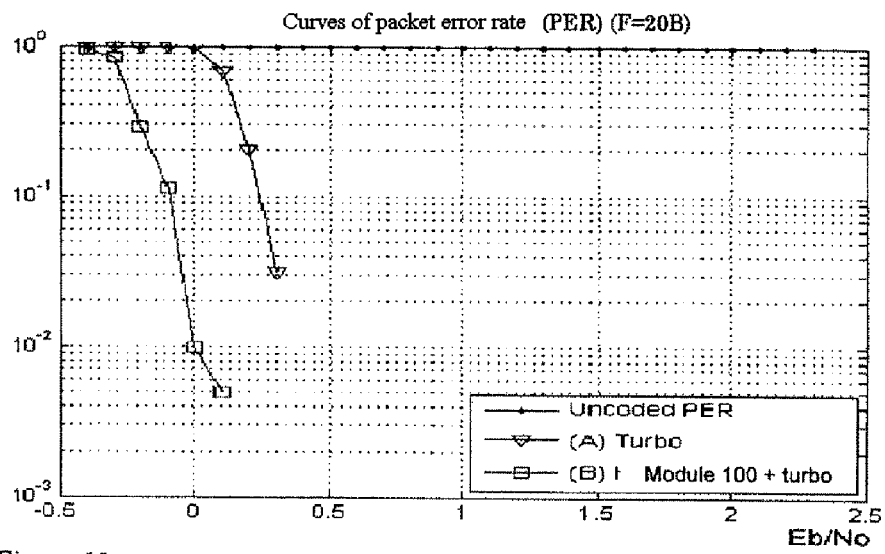
FIG. 11 illustrates curves of variation of the packet error rate PER with the installing of a corrector module according to the present invention and the methods according to the prior art for a given known sequence length F (F=20 bytes).

Represented in FIG. 11 are curves of variation of the packet error rate PER in the case of correction performed by the module 100 and Turbo coding (curve with squares); in the case of the Turbo coding prior art (curve with triangle); and without correction (curve with dots). These curves have been obtained for a length F of known sequence SP equal to 20 bytes.

Figure 12:
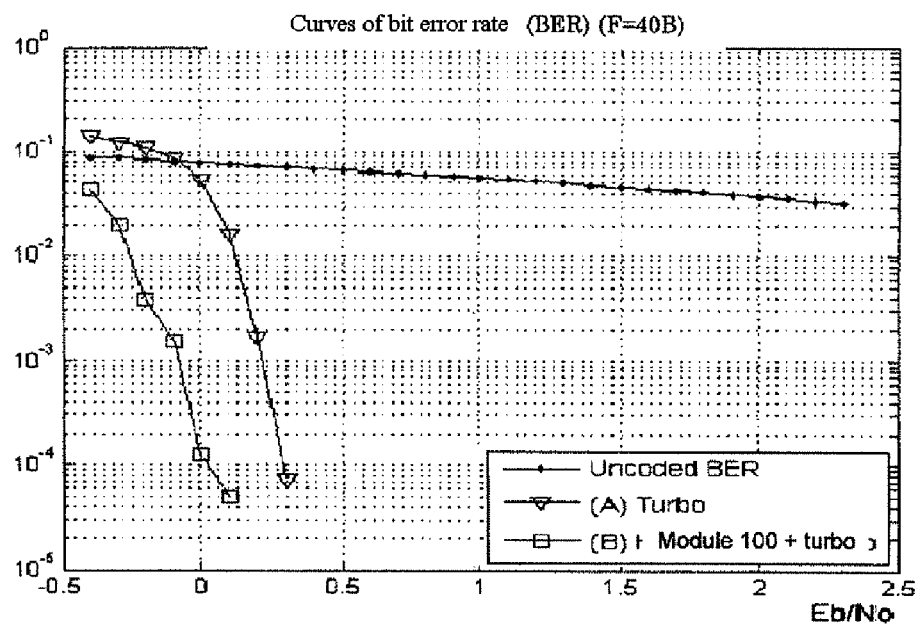
FIG. 12 illustrates curves of the bit error rate BER with the installing of a corrector module according to the present invention and the methods according to the prior art for a longer known sequence length F (F=40 bytes).

Represented in FIG. 12 are curves of variation of the bit error rate BER in the case of correction performed by the module 100 and Turbo coding (curve with the squares); in the case of the Turbo coding prior art (curve with triangle); and without correction (curve with dots). These curves have been obtained for a length F of known sequence SP equal to 40 bytes.

Figure 13:
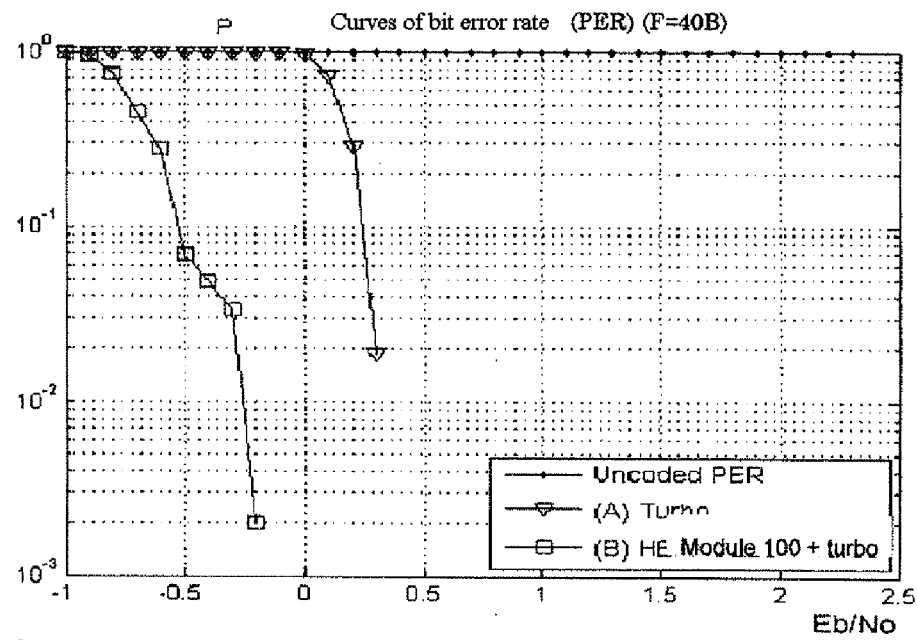
FIG. 13 illustrates curves of variation of the packet error rate PER with the installing of a corrector module according to the present invention and the methods according to the prior art for the same length F of known sequence as in FIG. 12 (F=40 bytes).

Represented in FIG. 13 are curves of variation of the packet error rate PER in the case of correction performed by the module 100 and Turbo coding (curve with squares); in the case of the Turbo coding prior art (curve with triangle); and without correction (curve with dots). These curves have been obtained for a length F of known sequence SP equal to 40 bytes.

Figure 14:
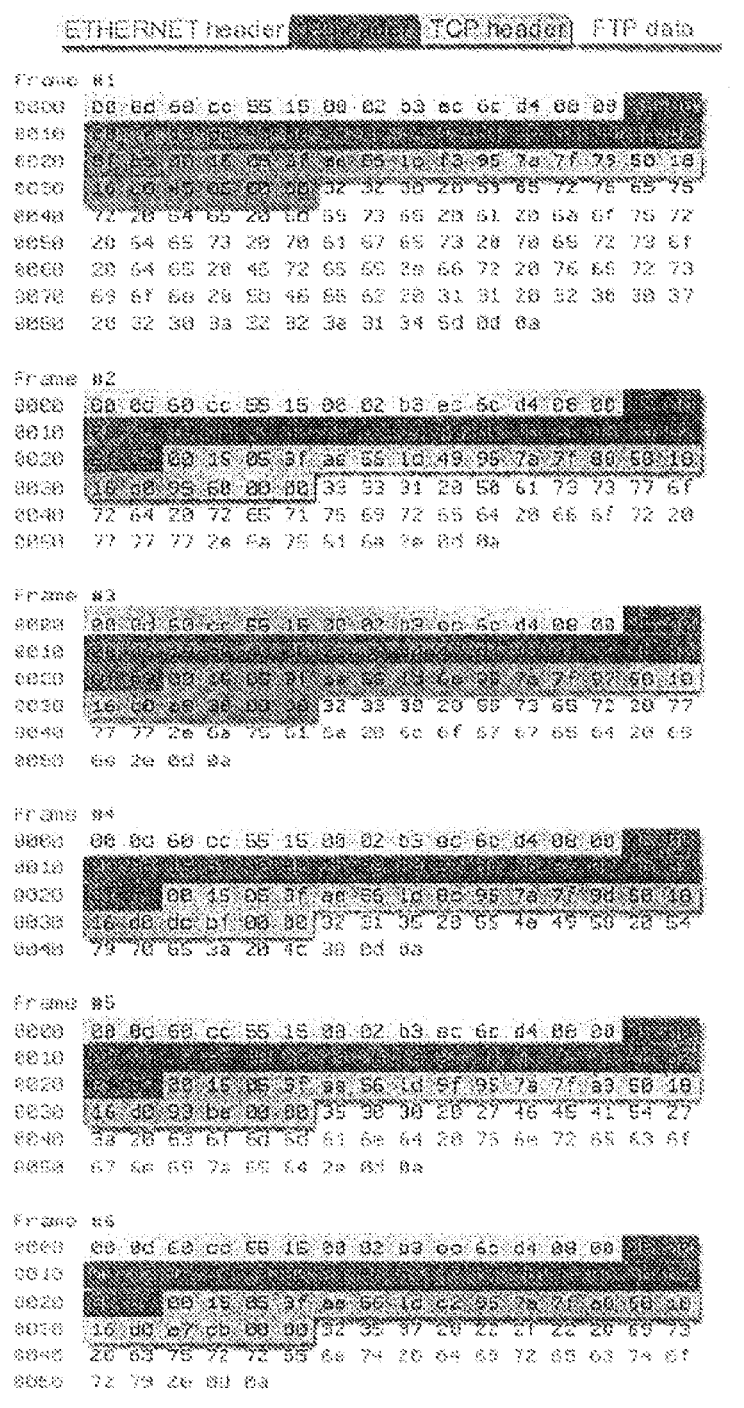

FIG. 14 illustrates an example in the case of a transfer of files using the FTP/TCP/IP/Ethernet protocol stack. This figure represents a hexadecimal extraction of the series of incoming packets captured at the Ethernet level. In the example of the protocol stack chosen, each packet comprises an Ethernet header, an IP header, a TCP header, and data of the FTP protocol. As may be seen, these headers comprise information fields that are constant across all the packets. These are static sequences, that are found distributed over one or more layers of a protocol stack.

The method utilizes this characteristic to search for known sequences on the basis of knowing the protocol stack, so as to correct erroneous sequences detected on the basis of this search.

The method utilizes the natural redundancy of the data generated by a protocol stack. It is not intrusive, as known transmission error correction methods can be. It can be implemented in any communication system, including satellite communication systems and those using ATM over ADSL links.

FIGS. 10 to 13 illustrate the improvement in the correction of transmission errors afforded by the method according to the invention, when it is placed in the transmission chain of FIG. 3A comprising a suitable FEC decoder 60.

What is claimed is:

1. A method for correcting transmission errors on reception in a data stream transmitted by a communication system using a stack of multilayer protocols, said method comprising:
   receiving an incoming data stream including packets of data generated by the stack of multilayer protocols, each of the data packets includes protocol fields whose content is constant for all the data packets;
   constructing a known sequence without adding information to the transmitted data stream, the known sequence including symbols characteristic of various layers of the stack of multilayer protocols and belonging to the protocol fields of the constant content;
   searching at a level of a receiver for sequences similar to the known sequence, wherein non-similar sequences are not being retained;
   in a case where similar sequences are present, detecting erroneous known sequences based at least in part on a measure of similitude between the similar sequences retained and the known sequence constructed; and
   modifying the erroneous known sequences detected.

2. The method for correcting errors, as claimed in claim 1, wherein when data of the incoming data stream are in a form of binary symbols, the modification of the erroneous known sequences comprises replacing the erroneous known sequence with the known sequence.

3. The method for correcting errors, as claimed in claim 1, wherein when data of the incoming data stream are in a form of real or quantized data, the modification of the erroneous known sequences comprises replacing the erroneous known sequence of real or quantized signals with a sequence of real signals that is representative of the known sequence.

4. The method for correcting errors, as claimed in claim 1, wherein the known sequence is composed of symbols that are contiguous in the incoming data stream or not contiguous.

5. The method for correcting errors, as claimed in claim 1, wherein the search for the sequences similar to the known sequence is carried out continuously on the incoming data stream.

6. A method for correcting transmission errors on reception in a data stream transmitted by a communication system using a stack of multilayer protocols, said method comprising:
   receiving an incoming data stream including packets of data generated by the stack of multilayer protocols, each of the data packets includes protocol fields whose content is constant for all the data packets;
   constructing a known sequence without adding information to the transmitted data stream, the known sequence including symbols characteristic of various layers of the stack of multilayer protocols and belonging to the protocol fields of the constant content;
   searching at a level of a receiver for sequences similar to the known sequence comprises:
      opening an analysis window of length equal to a length of the known sequence;
      calculating a detection threshold $\eta$;
      measuring similitude between an analyzed sequence and the known sequence;
      detecting a similar sequence when the measured similitude is greater than or equal to the detection threshold $\eta$, and non-similar sequences are not being retained;
   in a case where similar sequences are present, detecting erroneous known sequences based at least in part on the measured similitude between the similar sequences retained and the known sequence constructed; and
   modifying the erroneous known sequences detected.

7. The method for correcting errors as claimed in claim 6, wherein the calculation of the detection threshold $\eta$ corresponds to an estimation of an optimal threshold $\eta_{opt}$, the optimum threshold being obtained when a maximum probability of recovery of the known sequence is obtained.

8. The method for correcting errors as claimed in claim 6, wherein the search for a known sequence is carried out continuously by sliding the analysis window by one position at each displacement.

9. The method for correcting errors as claimed in claim 8, wherein the displacement by one position corresponds for example to a byte by byte or bit by bit displacement in the incoming data stream.

10. A module for correcting transmission errors in a data stream transmitted by a communications system using a stack of multilayer protocols, the module comprising:
    an input for receiving a data stream including packets of data generated by the stack of multilayer protocols, each of the data packets includes protocol fields whose content is constant for all the data packets; and
    a computer processor configured to:
       construct a known sequence without adding information to the data stream transmitted, the known sequence including symbols characteristic of various layers of the stack of multilayer protocols belonging to the protocol fields of the constant content;
       search for sequences similar to the known sequence, wherein non-similar sequences are not being retained; and
       detect erroneous known sequences in a case where similar sequences are present and for modifying the similar sequences, wherein the detection of erroneous known sequences being carried out based at least in part on a measure of similitude between the similar sequences retained and the known sequence constructed.

11. The module for correcting errors as claimed in claim 10, wherein the search for sequences corresponding to the known sequence and the detection of similar sequences comprises:
    open a window of length equal to length of the known sequence, for an analysis in the incoming data stream of sequences traveling through the window;
    calculate a detection threshold ($\eta_{opt}$),
    measure similitude between an analyzed sequence and the known sequence; and detect the similar sequence when the measured similitude is greater than or equal to the detection threshold ($\eta_{opt}$).

12. The module for correcting errors as claimed in claim 11, wherein the window is displaced from a position i to a position i+1 after each analysis of a sequence of predetermined length F formed of symbols received indexed from i to i+F−1.

13. The module for correcting errors as claimed in claim 10, wherein the module is located in a reception chain of a data stream communication system.

14. The module for correcting errors as claimed in claim 13, wherein the reception chain comprises a demodulator and a decoder and the error correction module being placed before, after, or inside the demodulator.

15. The module for correcting errors as claimed in claim 13, wherein said communication system is a satellite communication system.

16. The modules for correcting errors as claimed in claim 13, wherein said communication system uses ATM over ADSL links.

* * * * *

UNITED STATES PATENT AND TRADEMARK OFFICE
CERTIFICATE OF CORRECTION

PATENT NO.       : 8,479,074 B2
APPLICATION NO.  : 12/747517
DATED            : July 2, 2013
INVENTOR(S)      : Cantillo et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 427 days.

Signed and Sealed this
Eighth Day of September, 2015

Michelle K. Lee
*Director of the United States Patent and Trademark Office*